(12) United States Patent
Ciancitto

(10) Patent No.: US 6,315,653 B1
(45) Date of Patent: Nov. 13, 2001

(54) MOUNTING ASSEMBLY FOR DETACHABLY SUPPORTING AND ORIENTING STUFFING TUBES ON SAUSAGE ENCASING MACHINES

(75) Inventor: John William Ciancitto, Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/616,098

(22) Filed: Jul. 14, 2000

(51) Int. Cl.$^7$ ................................................. A22C 11/00
(52) U.S. Cl. ................................................................ 452/45
(58) Field of Search .................................................. 452/45

(56) References Cited

U.S. PATENT DOCUMENTS

| | | | |
|---|---|---|---|
| 765,295 | * | 7/1904 | Napier ..................................... 452/45 |
| 826,277 | * | 7/1906 | Rump ..................................... 452/45 |
| 872,294 | * | 11/1907 | Hambruch ............................. 452/45 |
| 888,305 | | 5/1908 | Bussinger . |
| 2,660,755 | | 12/1953 | Zenkert . |
| 3,949,446 | | 4/1976 | Smith . |
| 3,952,370 | | 4/1976 | Greider . |
| 6,135,870 | * | 10/2000 | Hamblin et al. ....................... 452/45 |

FOREIGN PATENT DOCUMENTS

| | | | |
|---|---|---|---|
| 927730 | * | 5/1955 | (DE) ....................................... 452/45 |
| 1121502 | * | 1/1962 | (DE) ....................................... 452/45 |
| 3455 | * | 12/1895 | (GB) ....................................... 452/45 |

* cited by examiner

*Primary Examiner*—Willis Little
(74) *Attorney, Agent, or Firm*—Zarley, McKee, Thomte, Voorhees & Sease

(57) ABSTRACT

A stuffing tube mounting assembly has an elongated barrel with a forward end terminating in a cylindrical barrel portion. A hollow elongated stuffing horn having a rearward end is detachably telescopically mounted on the barrel portion. Interlocking surfaces on the rearward end of the stuffing tube and the barrel portion hold the tube and the barrel in only a single radial orientation with respect to each other to maintain an inlet port in the side of the stuffing tube in a predetermined fixed position with respect to the barrel. The interlocking surfaces are elongated registering grooves in the stuffing tube and the barrel portion.

4 Claims, 5 Drawing Sheets

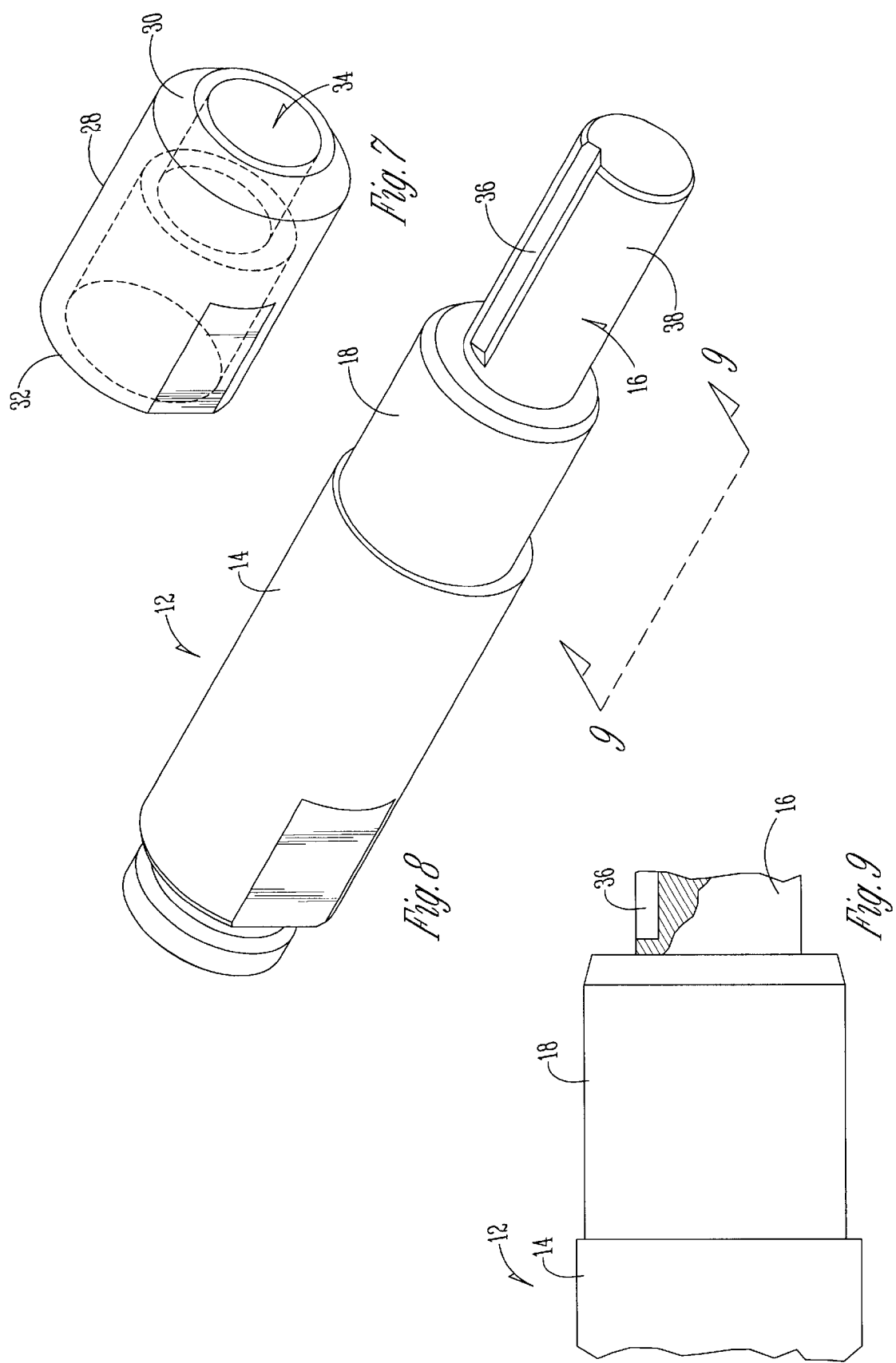

MOUNTING ASSEMBLY FOR DETACHABLY SUPPORTING AND ORIENTING STUFFING TUBES ON SAUSAGE ENCASING MACHINES

BACKGROUND OF THE INVENTION

Elongated hollow stuffing tubes are an integral part of all modern sausage encasing machines. They serve as the conduit upon which a hollow elongated casing material is mounted and through which meat emulsion is pumped for delivery into the casing.

These stuffing tubes are conventionally mounted on a solid elongated cylindrical stuffing tube end. The rearward end of the tube is slidably inserted over a protruding cylindrical portion of the stuffing tube end. The two components are then rigidly secured together by a stuffing tube pin, or a collar.

The principal shortcoming of the foregoing structure is that the stuffing tube has a meat intake port or opening that must be aligned with an outlet port of a meat emulsion pump. If the stuffing tube is not carefully placed in position on the stuffing tube end, misalignment of the outlet port of the pump and the inlet port of the tube will result. In such case, the tube must be disassembled from the stuffing tube end, then realigned, and then reassembled.

It is therefore a principal object of this invention to provide a mounting assembly for stuffing tubes on sausage encasing machines wherein the stuffing tube can only be secured to the stuffing tube end in a position that its meat inlet port will be oriented to align with the meat outlet port of the pump.

This and other objects will be apparent to those skilled in the art.

SUMMARY OF THE INVENTION

A stuffing tube mounting assembly has an elongated barrel with a forward end terminating in a cylindrical barrel portion. A hollow elongated stuffing horn having a rearward end is detachably telescopically mounted on the barrel portion. Interlocking surfaces on the rearward end of the stuffing tube and the barrel portion hold the tube and the barrel in only a single radial orientation with respect to each other to maintain an inlet port in the side of the stuffing tube in a predetermined fixed position with respect to the barrel. The interlocking surfaces are elongated registering grooves in the stuffing tube and the barrel portion.

BRIEF DESCRIPTION OF THE DRAWINGS

FIG. 7 is an enlarged scale perspective view of a retaining collar;

FIG. 8 is an enlarged scale view of the barrel;

FIG. 9 is an enlarged scale partial sectional view taken on line 9—9 of FIG. 8.

DESCRIPTION OF THE PREFERRED EMBODIMENT

Figure 1:
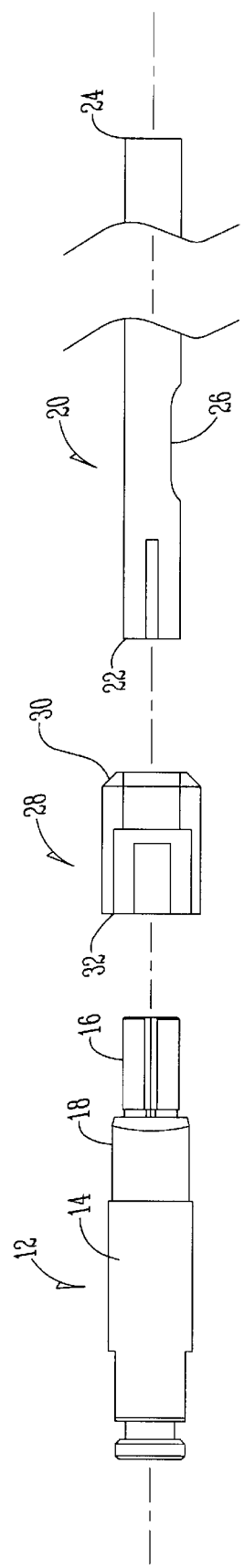
FIG. 1 is an exploded view of the parts of the invention.
Figure 5:
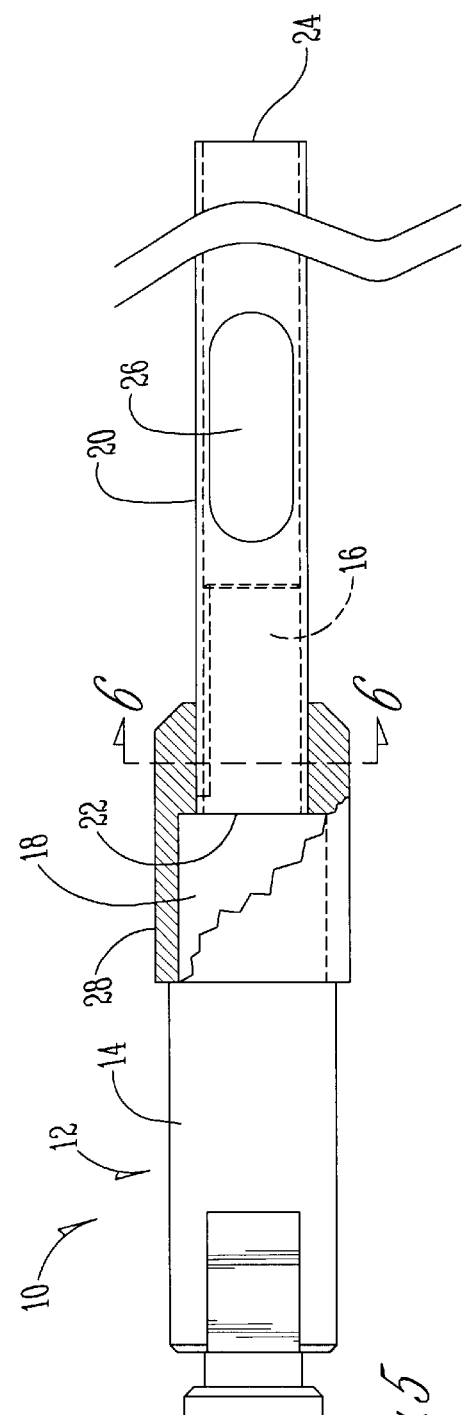
FIG. 5 is an assembled partial sectional view of the components of FIG. 1.
Figure 10:
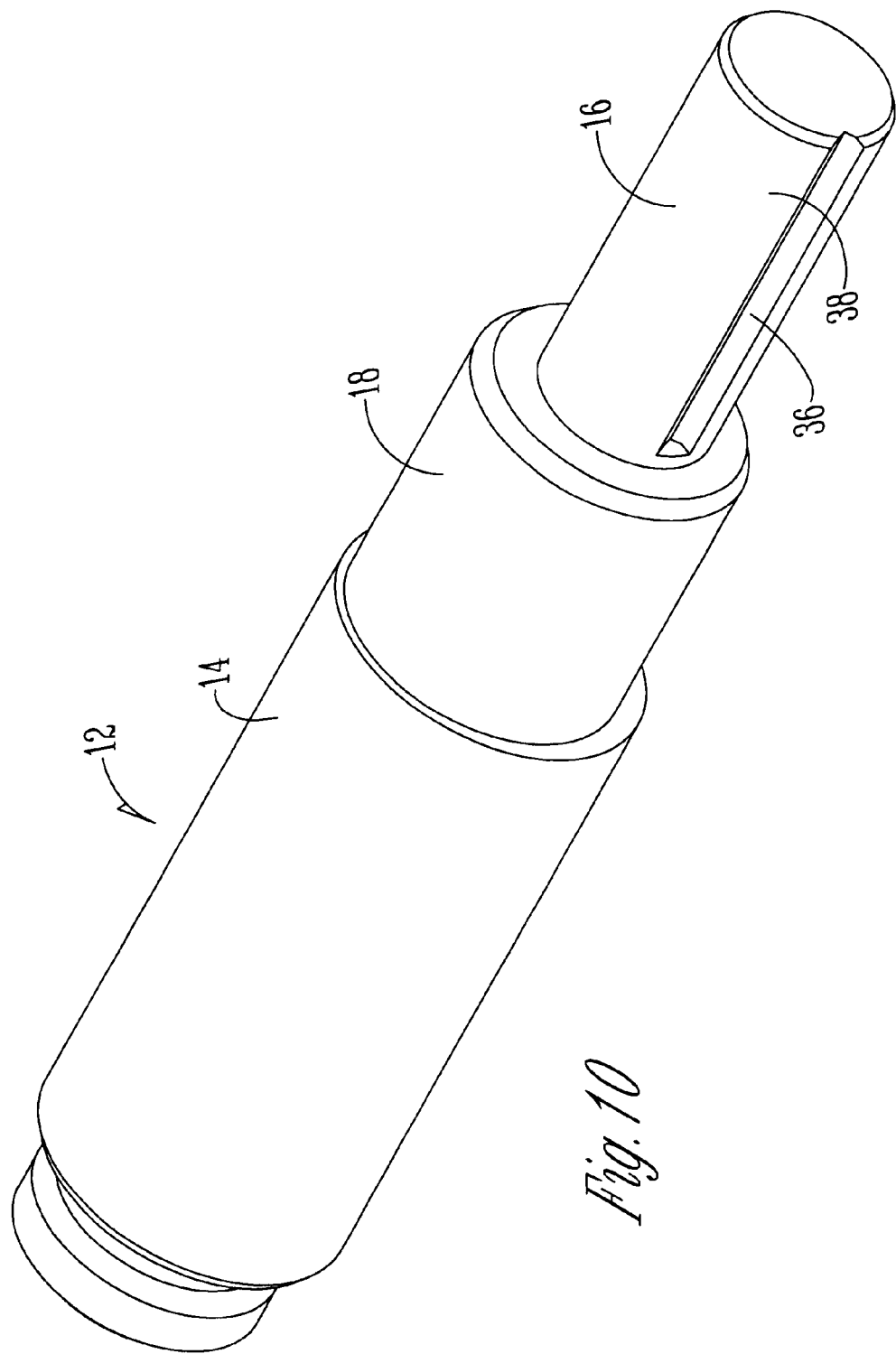
FIG. 10 is a perspective view like that of FIG. 8 with the barrel of FIG. 8 being rotated about its longitudinal axis 90° to better show its construction.

The numeral 10 designates the mounting assembly which is shown in exploded form in FIG. 1 and in assembled form in FIG. 5. The mounting assembly includes a first component which is a barrel 12 comprised of first barrel portion 14, second barrel portion 16, and intermediate barrel portion 18. As best seen in FIGS. 8 and 10, the first barrel portion 14 has a diameter greater than that of the intermediate barrel portion 18 which in turn has a diameter greater than the second barrel portion 16.

A conventional stuffing tube 20 has a rearward end 22 and a forward end 24 (FIG. 1). A conventional oblong meat emulsion port 26 is located in the side of the stuffing horn to receive meat emulsion from an outlet port of a meat emulsion pump (not shown).

A collar 28 (FIGS. 1, 7) has a forward end 30 and a rearward end 32, and a bore 34 extending therethrough. Collar 28 can be of any convenient construction to rigidly and detachably hold the stuffing tube in assembled engagement with the barrel portion 16 of barrel 12. See for example, the collar 42 and related construction of co-pending application Ser. No. 09/298,028 filed Apr. 22, 1999. That construction or others can be used in conjunction with the instant invention.

As best shown in FIGS. 8 and 10, barrel portion 16 has an elongated V-shaped groove 36 in its outer surface 38 which preferably extends the full length of the barrel portion 16. The groove 36 is straight and is parallel to a center axis of the barrel portion 16.

Figure 2:
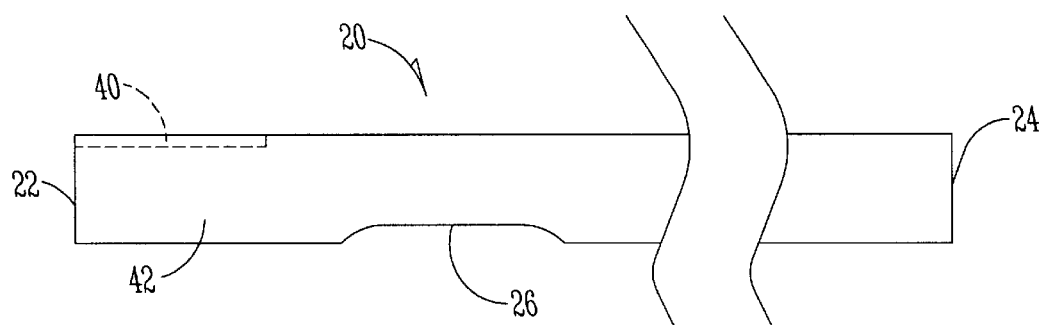
FIG. 2 is a partial side elevation of the stuffing tube.
Figure 3:
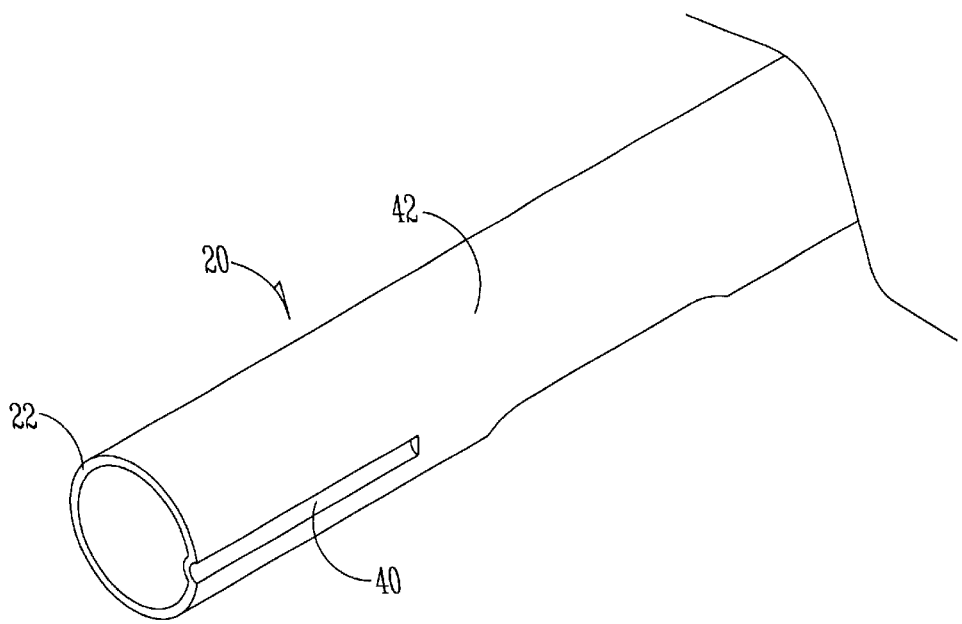
FIG. 3 is an enlarged scale partial perspective view of the rearward end of the stuffing tube.
Figure 4:
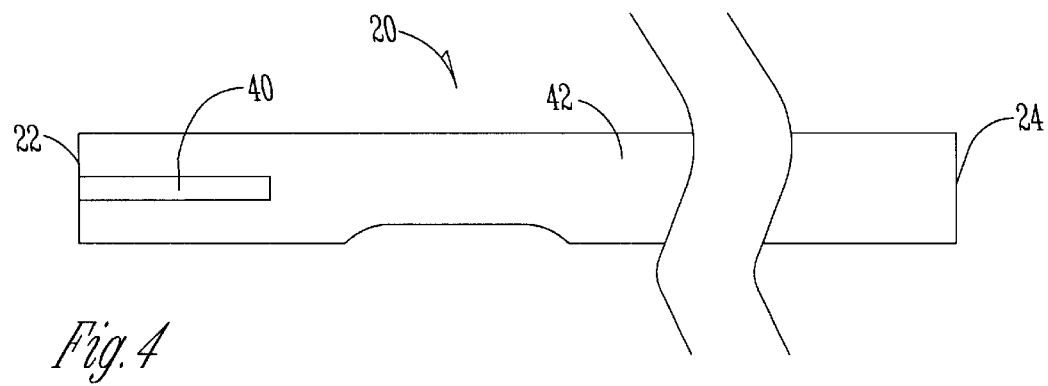
FIG. 4 is a partial plan view of the stuffing tube.
Figure 6:
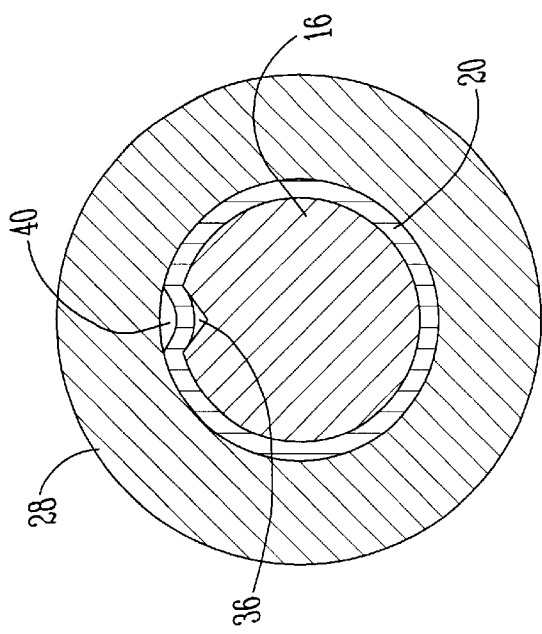
FIG. 6 is an enlarged scale sectional view taken on line 6—6 of FIG. 5.

With reference to FIGS. 2, 3 and 4, the rearward end 22 of the stuffing tube 20 has an elongated crease or groove 40 in its outer surface 42. Groove 40 preferably has a length equal to or greater than the length of groove 36 in barrel portion 16. The inner diameter of tube 20 is slightly larger than the outside diameter of barrel portion 16 so that the tube 20 can be telescopically moved on or off the barrel portion 16. The cross-sectional configuration of groove 40 is compatible with the cross-sectional configuration of groove 36 so that when the two grooves are longitudinally aligned for assembly purposes, the tube 20 can be telescopically mounted on barrel portion 16 as groove 40 on the tube 20 slides into groove 36 on barrel portion 16.

The assembly 10 is completed by slidably mounting the collar 28 into position on intermediate barrel portion 18 and the rearward end 22 of tube 20 as shown in FIG. 5 whereupon the collar can perform its usual conventional function to holding the tube 20 against longitudinal movement with the barrel 12 (e.g. via the teachings of application Ser. No. 09/298,028 referred to above).

With the groove 40 in tube 20 in engagement with groove 36 in barrel portion 16, the tube cannot be rotated with respect to the barrel portion 16. Thus, the inlet port 26 in the tube 20 will always be in a predetermined orientation whenever the tube 20 is assembled on barrel 12 because the grooves 36 and 40 permit assembly only in that predetermined orientation. Obviously, the location of port 26 is predetermined to be in the desired orientation to mate with the outlet port of a pump.

Thus, this invention requires that the tube 20 can only be mounted on barrel 12 when grooves 36 and 40 are in registering positions, and this arrangement will permit the outlet port 26 to assume only one position, and that will be in alignment with the outlet port of the pump. It is therefore seen that this invention will accomplish its objectives.

What is claimed is:

1. A stuffing tube mounting assembly, comprising, an elongated barrel having a longitudinal center axis and forward and rearward ends, a cylindrical barrel portion comprising the forward end, a hollow elongated stuffing horn having a rearward end detachably telescopically mounted on the barrel portion, the rearward end of the stuffing horn and the cylindrical barrel portion having interlocking surfaces which when in interlocking engagement with each other will prevent rotational motion therebetween and will hold the stuffing tube and the cylindrical barrel portion in only a single radial position with respect to each other, a meat emulsion inlet port in the stuffing tube which will be located in only a single radial position with respect to the barrel when the interlocking surfaces of the stuffing horn and barrel portion are in interlocking engagement with each other.

2. The assembly of claim 1 wherein retention means are provided for detachably holding the stuffing tube against longitudinal mount with respect to the cylindrical barrel portion.

3. The assembly of claim 2 wherein the retention means is a collar joining the stuffing tube and the barrel.

4. The assembly of claim 1 wherein the interlocking surfaces are elongated registering grooves in the stuffing tube and the cylindrical barrel portion.

* * * * *